(12) United States Patent
Nichols

(10) Patent No.: US 7,909,291 B2
(45) Date of Patent: Mar. 22, 2011

(54) DETECTION SYSTEM AND METHOD FOR ICE AND OTHER DEBRIS

(75) Inventor: Davis B. Nichols, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/834,224

(22) Filed: Jul. 12, 2010

(65) Prior Publication Data

US 2010/0282911 A1    Nov. 11, 2010

Related U.S. Application Data

(62) Division of application No. 10/854,691, filed on May 26, 2004, now Pat. No. 7,784,739.

(51) Int. Cl.
*B64D 15/02* (2006.01)
(52) U.S. Cl. .................................................. 244/134 F
(58) Field of Classification Search ............... 244/134 F, 244/134 D, 134 R
See application file for complete search history.

(56) References Cited

U.S. PATENT DOCUMENTS

| | | | |
|---|---|---|---|
| 3,800,121 A | 3/1974 | Dean et al. | |
| 3,981,466 A | 9/1976 | Shah | |
| 4,099,691 A | 7/1978 | Swanson et al. | |
| 4,741,499 A | 5/1988 | Rudolph et al. | |
| 4,816,828 A | 3/1989 | Feher | |
| 5,011,098 A | 4/1991 | McLaren et al. | |
| 5,114,100 A | 5/1992 | Rudolph et al. | |
| 5,180,122 A | 1/1993 | Christian et al. | |
| 5,313,202 A | 5/1994 | Hansman, Jr. et al. | |
| 5,351,918 A | 10/1994 | Giamati et al. | |
| 5,475,204 A | 12/1995 | Giamati et al. | |
| 5,484,122 A | 1/1996 | DeSalve | |
| 5,541,733 A | 7/1996 | Gagnon | |
| 5,823,474 A | 10/1998 | Nunnally | |
| 5,865,397 A | 2/1999 | Herrmann | |
| 5,971,323 A | 10/1999 | Rauch et al. | |
| 6,069,565 A | 5/2000 | Stern et al. | |
| 6,079,670 A | 6/2000 | Porte | |
| 6,206,325 B1 | 3/2001 | Nunnally | |
| 6,452,180 B1 | 9/2002 | Nistler et al. | |
| 2002/0162962 A1 | 11/2002 | Rudolph | |
| 2004/0155151 A1 | 8/2004 | Szilder | |

FOREIGN PATENT DOCUMENTS

DE   198 32 833 A1   2/2000

OTHER PUBLICATIONS

Search Report and Written Opinion for PCT/US2005/015530 dated Apr. 10, 2006.

*Primary Examiner* — Tien Dinh
(74) *Attorney, Agent, or Firm* — Alston & Bird LLP

(57) ABSTRACT

A system and method for detecting debris on the surface of a member are provided, for example, for detecting ice or other debris on an outer surface of an aircraft. The detection system includes a heating device in thermal communication with the member, an infrared sensing device configured to sense infrared radiation emitted from the member, and a monitoring device in communication with the sensing device. The monitoring device is configured to monitor a change in emission from the member and thereby detect the presence of debris on the surface of the member.

20 Claims, 5 Drawing Sheets

DETECTION SYSTEM AND METHOD FOR ICE AND OTHER DEBRIS

CROSS REFERENCE TO RELATED APPLICATIONS

This application is a divisional of U.S. application Ser. No. 10/854,691 now U.S. Pat. No. 7,784,739, filed May 26, 2004, which is incorporated herein in its entirety by reference.

BACKGROUND OF THE INVENTION

1. Field of the Invention

The present invention relates to the detection of debris on a surface such as ice on an outer portion of an aircraft and, more particularly, relates to the detection of such debris according to the radiant characteristics of the surface and/or the debris.

2. Description of Related Art

The formation of ice and other debris on roadways, bridges, building structures, vehicles, and the like can negatively affect the characteristics of those devices. For example, the formation of ice on the outer surfaces of an aircraft can compromise the performance of the aircraft. For this reason, many aircraft have an ice detector that is used to determine whether ice may have formed on critical portions of the aircraft. One typical ice detector includes a probe that extends from the exterior of the aircraft. The probe is actuated to vibrate at a predetermined frequency. As ice or other debris forms or otherwise collects on the probe, the additional mass of the debris changes the frequency of vibration. The probe senses this change in frequency and, hence, recognizes that an icing condition exists at the probe. The icing condition on critical portions of the aircraft, such as the wings and control surfaces, can be inferred to exist when an icing condition exists at the probe, and a de-icing system can be activated. For example, the de-icing system can direct a flow of hot air from the aircraft engines through passages that extend through the wings, engine enclosures, or other portions of the aircraft to melt the ice. Alternatively, the de-icing system can include resistive heating elements disposed in the wings, engine enclosures, or other critical portions and configured to heat the critical portions to melt the ice.

Unfortunately, some uncertainty exists in the relationship between the icing condition as measured by the probe and the actual formation of ice on the critical portions of the aircraft. In order to provide a margin of safety to cover this uncertainty, the critical portions of the aircraft are at times heated when ice has not formed on those portions and to an extent beyond that which is necessary to de-ice them. This excessive heating requires bleed air from the aircraft engines or power from the aircraft electrical system and, therefore, unnecessary fuel consumption and/or decreased aircraft performance, thereby increasing the flight costs of the aircraft.

Thus, there exists a need for an improved system and method for detecting ice and/or other debris that can build up on critical portions of an aircraft or other devices. Preferably, the system should accurately detect the presence of debris on the critical portions of the device so that unnecessary heating or otherwise clearing of those portions can be minimized.

BRIEF SUMMARY OF THE INVENTION

The present invention provides a system and method for detecting debris on the surface of a member, e.g., ice on an outer surface of an aircraft, according to the change in the infrared radiation emitted from the member, which results from a diagnostic deposition of heat into the member. The presence of debris can be detected accurately and without relying on a correlation with an icing condition that exists at a remote probe.

According to one embodiment of the present invention, the detection system includes a heating device in thermal communication with the member, an infrared sensing device, and a monitoring device in communication with the sensing device. The heating device can be a conventional de-icing system, such as an electrical heating device or a system for directing hot gases through a passage in thermal communication with a wing or another member of an aircraft. The sensing device is configured to sense infrared radiation emitted from the member, and the monitoring device is configured to monitor a change in emission from the member and thereby detect the presence of debris on the surface of the member.

The monitoring device can be configured to compare the change in emission of the member to a predetermined characteristic. Further, the sensing device can be configured to sense infrared radiation emitted from a plurality of portions on the surface of the member, and the monitoring device can be configured to detect changes in radiation emitted from the plurality of portions and thereby detect the presence of debris on the surface of the member at each portion.

The monitoring device can also be configured to control the heating device. For example, the monitoring device can actuate the heating device upon detection of ice on the member. Further, the monitoring device can be configured to transmit an electronic signal to a status indicator device indicating the detection of debris on the member.

According to one method of the present invention, a heating device is actuated and thereby heats the member, a resulting change in the infrared radiation emitted from the member is sensed, and that change is analyzed to determine the presence or absence of debris on the surface of the member. For example, a profile of the radiation emitted from the member as a function of time can be determined, and that profile can be compared to predetermined characteristic temporal profiles. The predetermined profile characteristic can be determined by actuating the heating device when debris is known to exist on the member, sensing the infrared radiation emitted from the member, and determining the resulting change in the infrared radiation. Further, profiles of the radiation emitted from the member can be sensed and monitored for a plurality of portions of the surface to detect the presence of ice on the surface at each portion.

The debris can be detected according to the rate of increase in the radiation emitted from the member during and following the heating step or the rate of decrease in the radiation emitted from the member subsequent to the heating step. Further, upon detection of debris on the member, an electronic signal can be transmitted to a status indicator device, and/or the heating device can be automatically actuated to a debris-clearing mode.

According to one aspect of the invention, the detection method and system are used to detect ice on an outer portion of an aircraft. The heating device and the sensing device can be onboard the aircraft and configured to operate during flight or on the ground. Alternatively, the sensing device can be remote from the aircraft and configured to sense the radiation emitted while the aircraft is on the ground or in flight. In either case, the actuating, sensing, and determining can be repeated according to a predetermined schedule.

BRIEF DESCRIPTION OF THE SEVERAL VIEWS OF THE DRAWINGS

Figure 1:
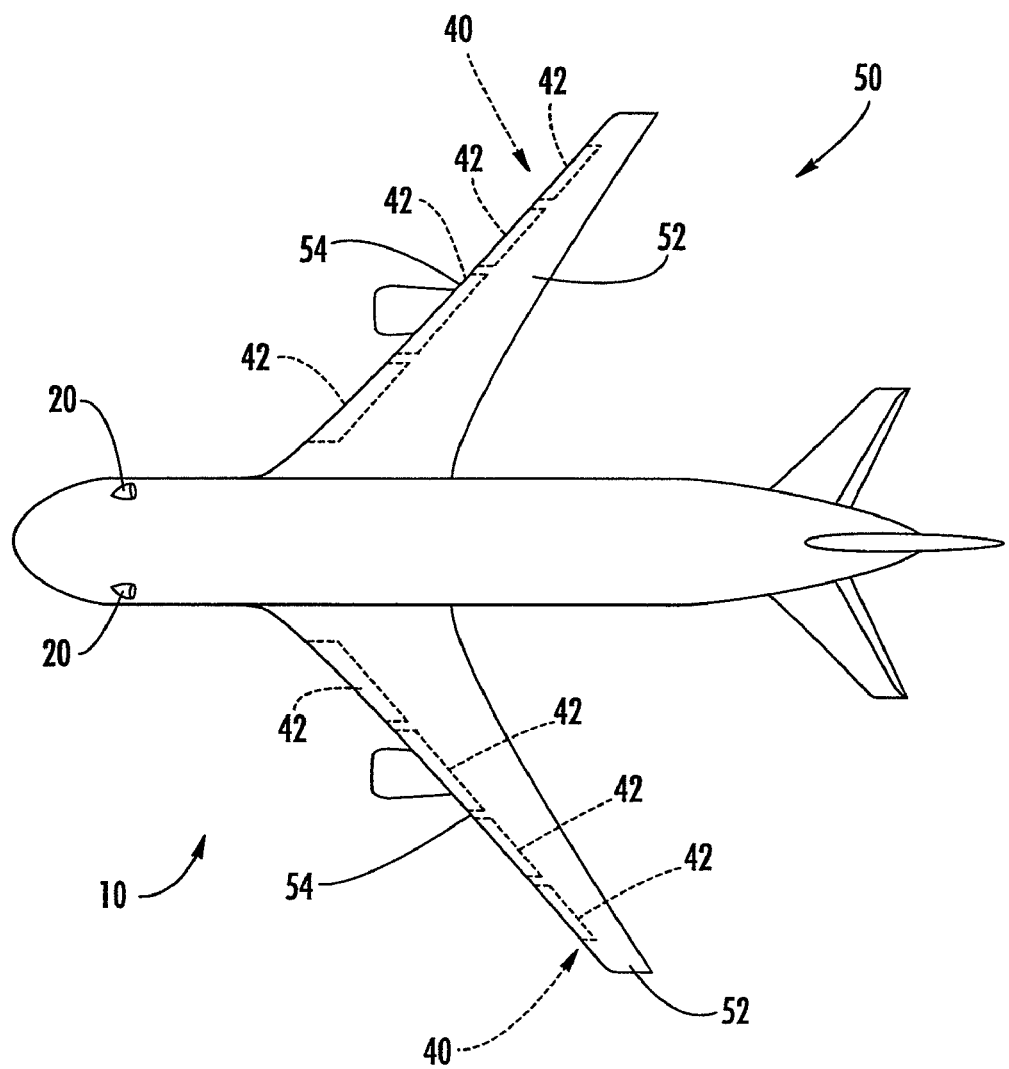
Figure 2:
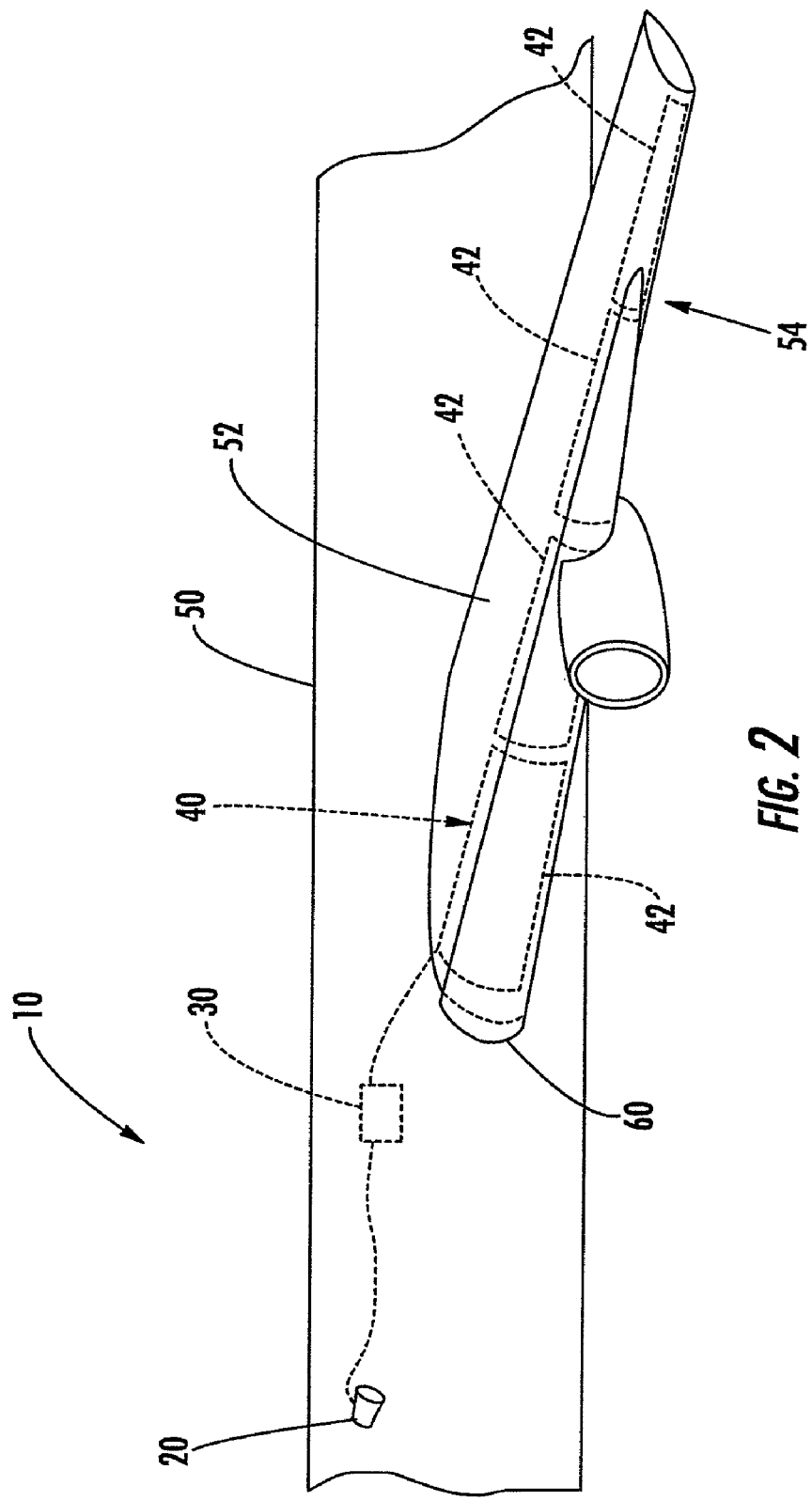
Figure 3:
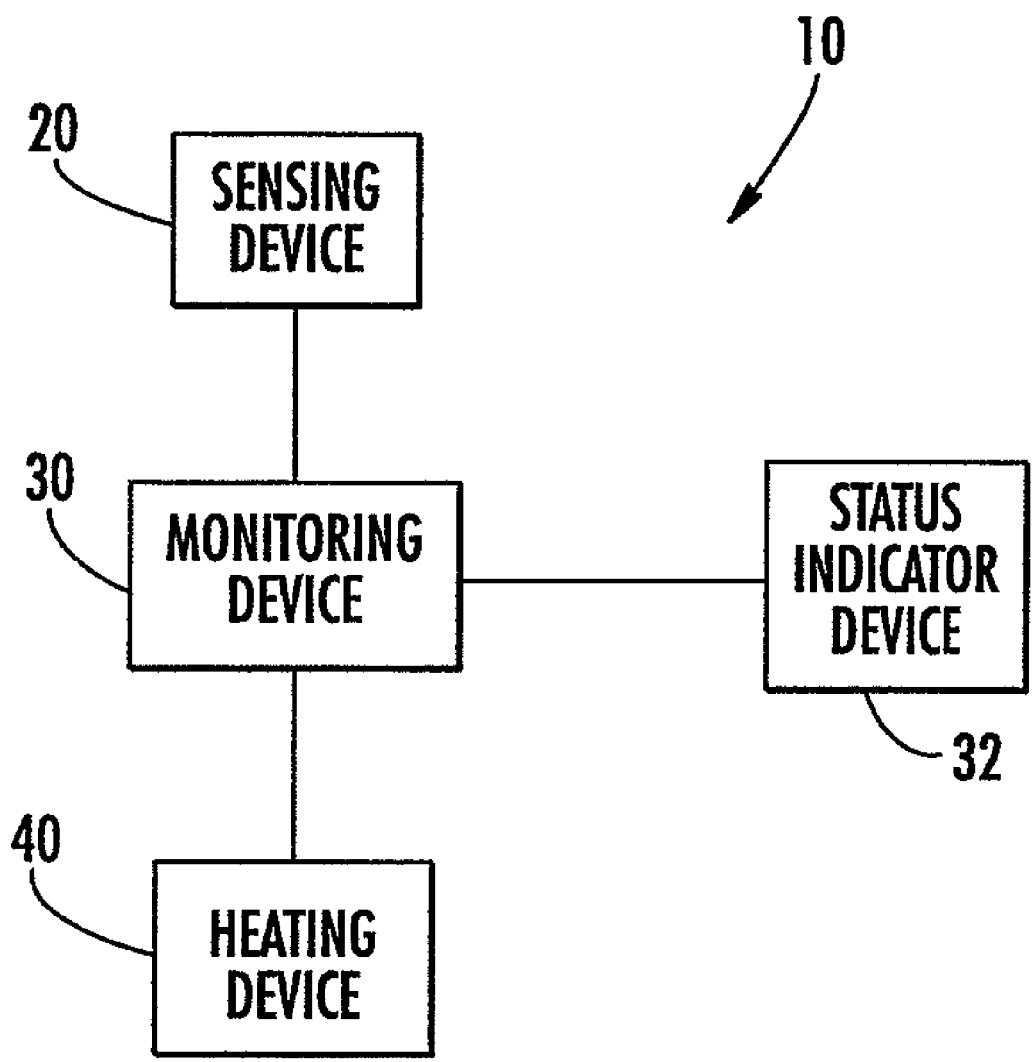
Figure 4:
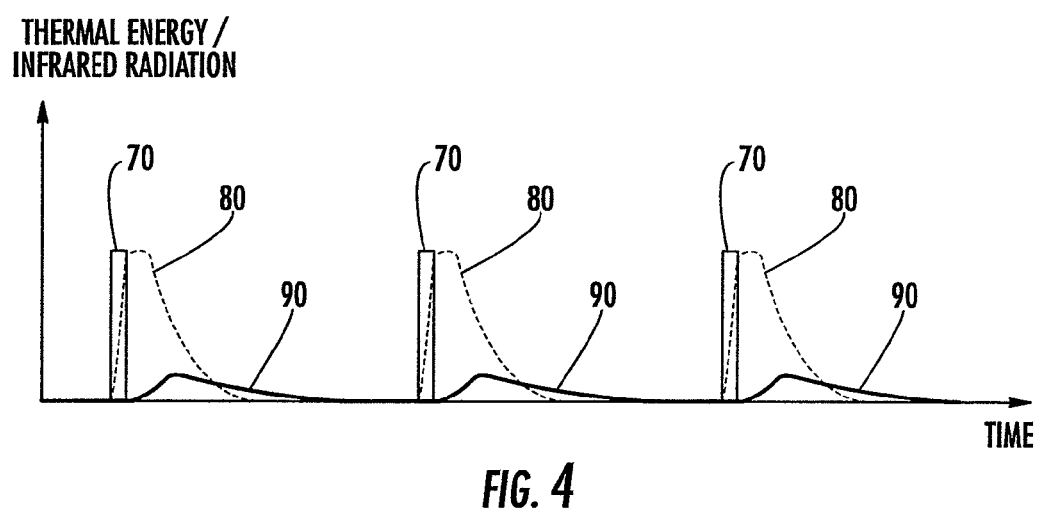
Figure 5:
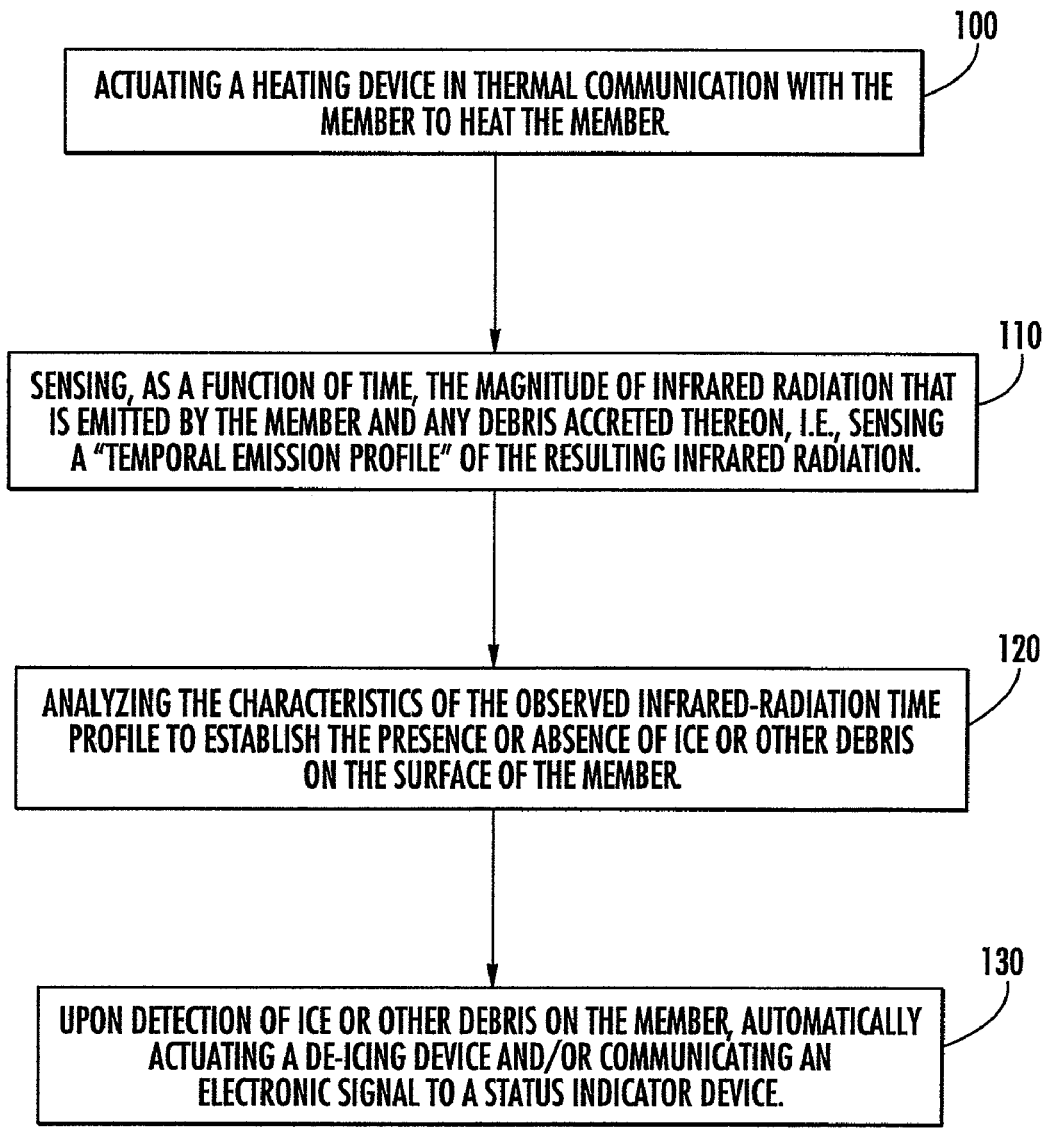

Having thus described the invention in general terms, reference will now be made to the accompanying drawings, which are not necessarily drawn to scale, and wherein:

FIG. 1 is a plan view illustrating an aircraft with a system for detecting ice or other debris on the aircraft according to one embodiment of the present invention;

FIG. 2 is a perspective view illustrating one wing of the aircraft of FIG. 1;

FIG. 3 is a schematic diagram illustrating the detection system according to one embodiment of the present invention;

FIG. 4 is a graph illustrating the magnitudes and temporal behavior of diagnostic thermal energy impulses delivered to the surface to be tested, and the magnitudes and temporal behavior of the resulting infrared radiation signature impulses emitted by the combination of the surface and any debris accreted thereon, as observed by a detection system such as the detection system illustrated in FIG. 3; and FIG. 5 is a flow chart illustrating the operations for detecting ice or other debris on a surface according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIGS. 1-3, there is shown a detection system 10 for detecting ice or other debris on an aircraft 50. The application of the detection system 10 of the present invention is not limited to aircraft, and it is understood that the detection system 10 can be used to detect ice or other debris on a variety of members and surfaces. For example, the detection system 10 can be used to detect ice on any part of the aircraft 50. Alternatively, in other embodiments of the invention, the detection system 10 can be used to detect debris on a roadway, bridge, aircraft runway, building, space structure, marine or other vehicles, and the like. Further, the system 10 can be used for detecting various types of debris including ice, dirt or dust, water, and other materials. Such members emit infrared radiation in varying magnitudes, and the magnitude of infrared radiation from each member generally varies as a function of temperature.

As shown in FIGS. 1 and 2, the detection system 10 includes at least one infrared sensing device 20 that is configured to sense infrared radiation emitted by a member of the aircraft 50. For example, each sensing device 20 illustrated in FIG. 1 is configured to sense radiation emitted from a respective wing 52 of the aircraft 50, but in other embodiments, the sensing device 20 can additionally or alternatively sense emissions from other members of the aircraft 50 such as the rudders, elevators, engine shrouds, propellers, and the like. In addition, while the sensing device 20 is shown to be an onboard device, i.e., mounted on the aircraft 50, the device 20 can alternatively be remotely mounted. For example, the sensing device 20 can be mounted on the ground proximate to a runway or hangar for sensing radiation emission from the aircraft 50 while the aircraft 50 is stationary or in motion. Alternatively, the sensing device 20 can be portable, e.g., a handheld device that can be held by an operator. In any case, the sensing device 20 can be an infrared camera that senses the infrared radiation emitted from a plurality of portions or points of the wing 52 and any debris accreted thereon. In particular, the device 20 can be a multi-pixel device, each pixel configured to sense the radiation emitted from a corresponding portion of the wing 52.

As illustrated in FIGS. 2 and 3, the sensing device 20 communicates with a monitoring device 30 that is configured to monitor the infrared emissions from the wing 52. For example, the monitoring device 30 can be located within the cabin of the aircraft 50 and can be electrically connected to the sensing device 20 by wire. Alternatively, the monitoring device 30 can be located integrally with the sensing device 20, or the monitoring device 30 can be a remote device configured to communicate with the sensing device 20 via radio transmission or otherwise. Where multiple sensing devices 20 are used, such as for the wings 52 of the aircraft 50 of FIG. 1, each sensing device 20 can be connected to a separate monitoring device 30 or more than one sensing device 20 can be connected a single monitoring device 30.

As illustrated in FIGS. 1 and 2, the detection system 10 also includes a heating device 40 in thermal communication with the wing 52. The illustrated heating device 40 is a conventional de-icing system for melting and thereby removing ice 60 from the wings 52 of the aircraft 50 before or during flight. Electrically resistive material 42 is disposed in, on, or near the wing 52, for example, on the inner surface of the leading edge 54 of the wing 52. When used for conventional de-icing, the resistive material 42 is electrically energized, and the resulting thermal energy heats the wing 52 and melts ice thereon. Alternatively, the de-icing system can be a system for directing hot gas, i.e., "bleed air," from the aircraft engines through one or more passages in thermal communication with the wings 52. The use of hot gas and electrical resistive heating for de-icing is described in, for example, U.S. Pat. No. 3,981,466 to Shah; U.S. Pat. No. 5,011,098 to McLaren, et al.; U.S. Pat. No. 5,865,397 to Herrmann; and U.S. Pat. No. 4,741,499 to Rudolph, et al., each of which is assigned to the assignee of the present application, and the entirety of each is incorporated herein by reference.

The monitoring device 30 is configured to monitor changes in emission radiated by the wing 52, for example, an increase in infrared emission due to operation of the heating device 40 or a decrease in infrared emission upon terminating operation of the heating device 40. It is understood that infrared energy can also be emitted by ice 60 or other debris accreted or deposited on the wing 52, and the total emission from the combination of the wing 52 and any ice 60 or other debris thereon is generally referred to herein as radiation from the wing 52, even though some of the radiation may originate in the ice 60 or debris. FIG. 4 graphically illustrates a time sequence of three thermal input impulses 70 delivered to the wing 52, as generated by the heating device 40, e.g., three intervals during which the electrical heating device 40 is energized. FIG. 4 also graphically illustrates two exemplary resulting emission profiles 80, 90 of radiation coming from the wing 52 of the aircraft 50 during and following the three thermal impulses 70 delivered by the heating device 40. The first profile 80 is representative of the emission from a wing 52 on which no ice 60 is deposited, i.e., a bare or clean wing. In the illustrated embodiment, the infrared emission of the bare wing rises rapidly upon operation of the heating device 40, peaks shortly after each thermal impulse 70 ends, and subsequently decreases. The second profile 90 is representative of the emission from a wing 52 on which ice 60 or other debris is deposited. As shown, the emission of the ice-bearing wing is expected to rise less rapidly than that of the bare wing and to rise to a maximum value that is smaller than the maximum value observed in the case of the bare wing. In addition, the emission from the ice-bearing wing can decrease at a slower rate than the rate of decreases for the bare wing.

For simplicity of illustration, FIG. 4 exhibits a case in which the bare-wing response 80 and the ice-bearing response 90 both start from the same baseline, that is the same equilibrium level of emission as it exists before the diagnostic thermal impulse 70 is applied. However, in other embodiments of the present invention, the detection system 10 can compare the profiles 80, 90 even if the profiles 80, 90 have different baseline levels.

While the present invention is not limited to any particular theory of operation, it is believed that if a thermal impulse 70 is delivered to the wing 52, the resulting radiation energy observed by the sensing device 20 will be different depending on whether the wing 52 does or does not carry accreted debris such as ice. Using ice as an example, this difference in observed radiation can result for the following reasons among others: (a) any ice 60 that has formed a layer between the wing 52 and the sensing device 20 has a significant coefficient of infrared absorption and therefore tends to block radiation transmitted from the wing 52 to the sensing device 20, so that less radiation from the underlying wing surface will be observed by the sensing device 20, and at the same time, that ice layer itself emits characteristic radiation from its surface, which will be observed by the sensing device 20; (b) the accreted ice 60 will have added mass and thereby will have added heat capacity to the wing 52, and so will reduce the temperature rise of the wing 52 relative to the temperature rise of the bare wing 52 for a given quantity of thermal energy delivered by the heat input impulse 70; (c) the finite thermal diffusivity of the ice 60 results in a delay between the time of the thermal impulse 70 and the rise in temperature of the outer surface of the ice 60; (d) the ice 60 possesses a significant heat of fusion and therefore, for the case in which the inner surface of the ice reaches melting temperature, the temperature rise of the ice layer, including the outer surface of the ice layer observed by the sensing device 20, is delayed during the time that the inner surface of the ice layer is being converted to water. For these reasons and/or other or different reasons, a thermal impulse to an ice-bearing surface of the wing typically results in a time-dependent profile of radiation, i.e., a temporal emission profile, from the wing in which the maximum value is smaller in magnitude and occurs later in time, relative to the time-dependent profile of radiation from the bare-wing surface.

The monitoring device 30 detects the presence of ice 60 or other debris on the surface of the wing 52 according to the change in radiation observed from the wing 52. For example, the monitoring device 30 can compare the change in emission of the wing 52 to a predetermined characteristic, such as a predetermined value, rate, or temporal profile of radiation emission. According to one embodiment of the present invention, the profile characteristic is determined by a calibration operation in which a thermal impulse is initiated by actuating the heating device 40 at a time when ice is known to exist on the wing 52 and, separately, at a time when the wing 52 is known to be bare. The monitoring device 30 monitors the changes in the infrared radiation emitted and determines a profile characteristic that is representative of the ice-bearing wing and a profile characteristic that is representative of the bare wing. For a particular thermal impulse, the profile characteristic can be a particular rate of increase or decrease in emission or a range of such rates, a multi-order or other complex profile representative of the increase or decrease in emission, a time or range of times for which the emission is above or below a particular value, and the like. It is understood that a variety of other profile characteristics can be determined including, for example, a maximum value, i.e., the peak height of the radiation emission curve of FIG. 4; the time interval between the thermal impulse and the maximum value or the overall phase of the emission profile relative to a periodic thermal impulse; the total radiation emitted from the wing 52, e.g., represented by the area defined by the emission profile and determined as an integral of the emission profile; and/or other aspects of the shape of the emission profile. Further, the profile characteristic can be determined by theoretical or other methods. In particular, the profile characteristic can be determined as a function of the magnitude and duration of the heating impulse, the thermal characteristics of the wing material, the presence and thermal characteristics of any debris on the wing 52, and the emissivity of the surface of the wing 52 and/or debris material.

The monitoring device 30 can also be configured to communicate with the heating device 40 to initiate the operation of the heating device 40 in a pulsed diagnostic mode to test for debris on command. The monitoring device 30 can also actuate the heating device 40 according to a predetermined schedule to periodically test for debris. In particular, the monitoring device 30 can control the heating device 40 to initiate operation of the heating device 40 for a predetermined interval and thereby initiate thermal impulses for heating the wing 52. For example, the monitoring device 30 can energize the heating device 40 during an interval of between a fraction of a second and one or more minutes. The monitoring device 30 can be configured to initiate such impulses in order to determine the profile characteristics by the calibration operation described above.

Further, the monitoring device 30 can be configured to perform various functions upon detection of ice 60 on the wing 52. For example, the monitoring device 30 can transmit an electronic signal to a status indicator device 32 such as a visual or audible enunciator in the cockpit of the aircraft to alert the pilot or other crew members. In addition, the status indicator can be recorded as a data entry in a flight log or other record. The monitoring device 30 can also be configured to actuate the heating device 40 to automatically begin a de-icing process upon detection of the ice 60. While the heating device 40 can be pulsed or otherwise selectively operated in the diagnostic mode, the heating device 40 in the de-icing mode can be operated to provide sufficient thermal output for de-icing the wing 52, e.g., by continuously heating the wing 52 until any ice thereon is melted.

In one advantageous embodiment of the present invention, the sensor device 20 is a multi-pixel device, and the monitoring device 30 is configured to independently detect the ice 60 on a plurality of portions of the wing 52. The term "pixel" is not meant to be restrictive, and it is understood that each pixel can include one or more of the most elementary sensing members of the device 20. Each pixel of the sensor device 20 can be configured to sense the radiation emitted from a corresponding portion of the wing 52, and the monitoring device 30 can be configured to monitor each pixel independently and detect ice on each portion of the wing 52 according to profile characteristics of each portion. Thus, the detection system 10 can be used to "map" the location of the ice 60 on the wing 52. Further, once ice has been detected, the monitoring device 30 can control individual units of the heating device 40, e.g., the individual resistive materials 42, so that the heating device 40 heats those portions of the wing 52 that bear the ice 60. In some embodiments of the present invention, multiple monitoring devices 30 can be used to analyze spatially separate portions of a member.

FIG. 5 illustrates the operations of detecting debris on a surface of a member according to one method of the present invention. It is understood that some of the operations can be omitted and/or additional operations can be performed without departing from the present invention. For example, in Block 100, a heating device in thermal communication with the member is actuated to heat the member. The heating device can be a de-icing system that is integral to an aircraft wing or other member, such as an electrical heating device or a system for directing hot gas through a passage in thermal communication with the member. The resulting infrared radiation that is emitted from the member is sensed. See Block 110. If the member is part of an aircraft, the radiation can be sensed during flight or while the aircraft is on the ground. Subsequently, the characteristics of the observed temporal profile of the infrared radiation are analyzed to determine if debris is present on the member. See Block 120. For example, a profile of the radiation that is emitted from the member can be determined, and the profile can be compared to a predetermined profile characteristic, which can be determined by actuating the heating device and sensing the infrared radiation at a time when debris is known to exist on the member. Upon detection of ice or other debris on the member, the heating device can be automatically actuated, and/or an electronic signal can be communicated to a status indicator device. See Block 130.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for detecting ice on a surface of an aircraft, the method comprising:
   heating the surface as a diagnostic measure by activating a de-icing device integral to the aircraft and in thermal communication with the surface;
   independently sensing infrared radiation emitted from a plurality of portions of the surface; and
   determining changes in the infrared radiation emitted from the plurality of portions resulting from the heating of the surface by the de-icing device in the heating step to determine an emission profile for each of the portions and thereby detect the presence of ice on the surface of one or more portions, wherein the emission profile of a respective portion is based upon the radiation emitted from the respective portion.

2. A method according to claim 1 wherein said heating step comprises electrically energizing an electrical de-icing device.

3. A method according to claim 1 wherein said heating step comprises directing a flow of hot gases through a passage in thermal communication with the surface.

4. A method according to claim 1 wherein said heating step extends for a predetermined interval of time.

5. A method according to claim 1 wherein said determining step comprises comparing the profiles to predetermined profile characteristics and thereby detecting the presence of ice on the portions.

6. A method according to claim 5 further comprising, before said heating step:
   actuating the de-icing device and thereby heating the surface at a time when ice is known to exist on the surface;
   sensing the infrared radiation emitted from the plurality of portions of the surface with ice; and
   determining a change in the infrared radiation for each portion and thereby establishing the predetermined profile characteristic for each portion.

7. A method according to claim 1 wherein said determining step comprises determining the profiles of the radiation emitted from the portions during said heating step.

8. A method according to claim 1 wherein said determining step comprises determining the profiles of the radiation emitted from the portions following said heating step.

9. A method according to claim 1 further comprising performing at least one function of the group consisting of actuating the de-icing device to a de-icing mode and transmitting an electronic signal to a status indicator device upon detection of ice on the surface.

10. A method according to claim 1 further comprising repeating said heating, sensing, and determining steps according to a predetermined schedule.

11. A method of detecting ice on a surface of a member, the method comprising:
    a first heating step comprising heating the member at a time when ice is known to exist on the member;
    after said heating step and while the ice is known to exist on the member, sensing infrared radiation emitted from the member and determining a change in the infrared radiation to thereby establishing a predetermined profile characteristic of the member;
    a second heating step comprising heating the member by actuating a de-icing system integral to the member and in thermal communication with the member;
    after a start of said second heating step, sensing an infrared radiation emitted from a portion of the surface of the member opposite the de-icing system during a time interval; and
    determining a temporal emission profile of the radiation emitted from the portion of the member during the time interval and comparing the temporal emission profile of the member to the predetermined profile characteristic to thereby detect the presence of ice on the surface of the member.

12. A method according to claim 11 wherein said determining step comprises comparing the profiles to predetermined profile characteristics and thereby detecting the presence of ice on the portions.

13. A method according to claim 11 wherein said determining step comprises determining the profiles of the radiation emitted from the portions during said heating step.

14. A method according to claim 11 wherein said determining step comprises determining the profiles of the radiation emitted from the portions following said heating step.

15. A method according to claim 11 further comprising performing at least one function of the group consisting of actuating the de-icing device to a de-icing mode and transmitting an electronic signal to a status indicator device upon detection of ice on the surface.

16. A method of detecting ice on a surface of a member, the method comprising:
    sensing emissions of an infrared radiation from the surface of the member;
    heating the member during a time interval if the sensed emissions are below a characteristic temporal emission profile;
    sensing emissions of the infrared radiation from the surface of the member during the time interval; and
    determining a change in the infrared radiation resulting from the heating of the member in said heating step, and thereby detecting the presence of ice on the surface of the member.

17. A method according to claim 16 wherein said determining step comprises comparing the profiles to predetermined profile characteristics and thereby detecting the presence of ice on the portions.

18. A method according to claim 16 wherein said determining step comprises determining the profiles of the radiation emitted from the portions during said heating step.

19. A method according to claim 16 wherein said determining step comprises determining the profiles of the radiation emitted from the portions following said heating step.

20. A method according to claim 16 further comprising performing at least one function of the group consisting of actuating the de-icing device to a de-icing mode and transmitting an electronic signal to a status indicator device upon detection of ice on the surface.

* * * * *